(12) United States Patent  
Ruskin

(10) Patent No.: US 10,278,380 B2  
(45) Date of Patent: *May 7, 2019

(54) RODENT, WORM AND INSECT RESISTANT IRRIGATION PIPE AND METHOD OF MANUFACTURE

(71) Applicant: A. I. INNOVATIONS N.V., Corte Madera, CA (US)

(72) Inventor: Rodney Ruskin, San Rafael, CA (US)

(73) Assignee: A. I. Innovations N.V., Corte Madera, CA (US)

( * ) Notice: Subject to any disclaimer, the term of this patent is extended or adjusted under 35 U.S.C. 154(b) by 102 days.

This patent is subject to a terminal disclaimer.

(21) Appl. No.: 15/225,740

(22) Filed: Aug. 1, 2016

(65) Prior Publication Data

US 2017/0035044 A1 Feb. 9, 2017

Related U.S. Application Data

(60) Provisional application No. 62/202,849, filed on Aug. 9, 2015.

(51) Int. Cl.
*A01M 29/12* (2011.01)
*A01G 25/02* (2006.01)
*B05B 1/20* (2006.01)
*B29C 47/00* (2006.01)
*B29K 23/00* (2006.01)
(Continued)

(52) U.S. Cl.
CPC ............ *A01M 29/12* (2013.01); *A01G 25/023* (2013.01); *B05B 1/202* (2013.01); *B29C 47/0023* (2013.01); *B29C 47/0066* (2013.01); *B29C 47/0004* (2013.01); *B29C 47/028* (2013.01); *B29K 2021/00* (2013.01); *B29K 2023/0633* (2013.01); *B29K 2027/06* (2013.01); *B29K 2105/16* (2013.01); *B29K 2505/12* (2013.01); *B29K 2509/02* (2013.01); *B29L 2023/22* (2013.01)

(58) Field of Classification Search
CPC ....................................................... H01B 3/441
USPC ................................................... 174/120 AR
See application file for complete search history.

(56) References Cited

U.S. PATENT DOCUMENTS 2,971,161 A 2/1961 Ryznar
3,424,203 A 1/1969 Rubenstein
(Continued)

FOREIGN PATENT DOCUMENTS

| CN | 102321284 | 1/2012 |
| CN | 203735194 | 7/2014 |

(Continued)

OTHER PUBLICATIONS

Cab-O-Sil® Fumed Metal Oxides for Coatings—Performance Benefits; cabotcorp.com © 2014 Cabot Coropration; 1 page.
(Continued)

*Primary Examiner* — Stanley Tso
(74) *Attorney, Agent, or Firm* — Lewis Roca Rothgerber Christie LLP

(57) ABSTRACT

An irrigation tube having outlets extending along the length of the tube in a spaced relationship and finely-divided silica or iron oxide particles dispersed in the tube thereby increasing a surface hardness of the tube to deter rodent, worm or insect damage, the silica particles further can include an odor repellant located within the particles.

8 Claims, 2 Drawing Sheets

(51) Int. Cl.
   *B29K 21/00* (2006.01)
   *B29K 27/06* (2006.01)
   *B29K 105/16* (2006.01)
   *B29K 509/02* (2006.01)
   *B29K 505/12* (2006.01)
   *B29L 23/00* (2006.01)
   *B29C 47/02* (2006.01)

(56) References Cited

U.S. PATENT DOCUMENTS

| | | | | |
|---|---|---|---|---|
| 3,661,838 | A | | 5/1972 | Enomoto |
| 4,210,287 | A | | 7/1980 | Mehoudar |
| 4,371,113 | A | * | 2/1983 | Ross ............... A01G 25/06 239/201 |
| 5,881,775 | A | * | 3/1999 | Owen ............... F16L 9/10 138/149 |
| 6,561,731 | B1 | * | 5/2003 | Clare ............... A01G 25/02 29/237 |
| 7,886,775 | B2 | * | 2/2011 | Masarwa ............... F16L 9/16 138/123 |
| 2008/0191464 | A1 | * | 8/2008 | Yankovitz ............... A01C 21/00 285/5 |
| 2009/0133897 | A1 | * | 5/2009 | Jorand ............... H01B 3/30 174/113 R |
| 2010/0077837 | A1 | * | 4/2010 | Fryxell ............... B01J 20/103 73/23.41 |
| 2013/0087205 | A1 | * | 4/2013 | Berardi ............... F16L 11/00 137/1 |
| 2014/0145374 | A1 | * | 5/2014 | Altonen ............... C08K 5/11 264/328.14 |

FOREIGN PATENT DOCUMENTS

| | | | |
|---|---|---|---|
| DE | 10 2006 031 576 A1 | 1/2008 | |
| EP | 0455357 | * 4/1991 | ............... B05D 7/22 |
| EP | 0 455 357 A1 | 11/1991 | |
| JP | H09-38926 | 2/1997 | |

OTHER PUBLICATIONS

"Critter Damage", *Irrigation Training and Research Center*© 2008, pp. 12-14.
International Search Report and Written Opinion issued for International Application No. PCT/US16/45205; dated Jan. 10, 2017; 11 pages.y.
Conradi, M. et al., "Optimizing the performance of silica/polyvinyl chloride composites," Society of Plastics Engineers, Plastics Research Online, Jan. 21, 2013, 3 pages.
Gungor A., "Mechanical Properties of Iron Powder Filled High Density Polyethylene Composites", 2007.
First Examination Report issued in parallel New Zealand Application IP No. 739514, dated Jun. 27, 2018, 4 pages.

* cited by examiner

RODENT, WORM AND INSECT RESISTANT IRRIGATION PIPE AND METHOD OF MANUFACTURE

CROSS-REFERENCE TO RELATED APPLICATION(S)

This application claims priority to and the benefit of U.S. Provisional Application No. 62/202,849, filed Aug. 9, 2015, the contents of which are incorporated herein by reference.

FIELD OF THE INVENTION

This invention relates to rodent, worm and insect resistant irrigation pipe and a method of manufacturing thereof, and more particularly to low-density plastic and rubber irrigation pipe or plastic insulated cables including silica and silica compounds to provide hardness or iron and iron compounds to provide density or both silica and iron in combination therein to reduce damage caused by rodents, worms and insects. In addition, an odor producing deterrent can be incorporated into the compound during manufacture.

BACKGROUND ON THE INVENTION

All rodents are gnawers, their ever-growing teeth must be constantly trimmed by this process, which maintains a chisel-like shape to the incisors, which is unique to the rodent family. Rodents chew on roots and will often chew through plastic pipes and electric cables in search of water. It has been shown by field experience and numerous studies that damage by rodents gnawing on small diameter plastic pipes is determined by the hardness of the pipe, for example, polyethylene and flexible polyvinylchloride (PVC) is more likely to be chewed than rigid PVC pipe, and high-density polyethylene pipe is less likely to be damaged than low-density polyethylene pipe. The rodent first feels the pipe with either its incisors or claws, and if it is hard like a rock, it moves away. Thin-walled polyethylene pipes are also damaged by worms and insects.

Damage by gophers, rats and other rodents to polyethylene irrigation pipes and plastic insulated cables are well-known problems. While repellants based on smell may work above ground, below ground they are not effective. Example of such repellants are RODREPEL and REPELLEX. Low-density polyethylene irrigation pipe, tape, ribbon and electrical cables or other devices made of soft plastic or rubber are less expensive and easier to manufacture than high density polyethylene pipe and therefore is more desirable in the irrigation environment. In addition, low-density, soft plastic or rubber irrigation pipe and cables are easier to manipulate and incorporate either above or below ground in the irrigation environment and therefore are more desirable. Consequently, a need exists for a rodent, worm and insect resistant irrigation pipe and cables manufactured from low-density polyethylene, soft plastic or rubber.

SUMMARY OF THE INVENTION

The present invention is directed to low-density polyethylene, flexible PVC, other soft plastic or rubber irrigation pipe or cable that is rodent, worm and insect resistant. The irrigation pipe of the present invention is rodent, worm and insect resistant by the addition of silica or silica-based material into the plastic or rubber material during manufacture to thereby increase the surface hardness of the irrigation pipe or cable, thus deterring damage caused by rodents, worms and insects. The irrigation pipe of the present invention is rodent, worm and insect resistant also by the addition of iron or iron-based material into the plastic or rubber material during manufacture to thereby increase the density of the irrigation pipe or cable, thus deterring damage caused by rodents, worms and insects. This application of silica or iron or silica and iron in combination can be used to deter a wide range of animals from very small insects to large rodents from damaging a wide range of products from thin walled irrigation tape to insulated cable. The protection can further be increased by the addition of an odor producing deterrent into the silica particles during manufacture. If a rodent approaches a low-density polyethylene subsurface drip irrigation pipe protected through the incorporation of silica, the rodent will be deterred when their incisors encounter a hard particle of silica on the irrigation pipe or cable. When iron is added the increase in density may increase the deterrence. If a deterrent odor-emitting substance is carried in the silica, this will add to the probability of effective repulsion of the rodent. This same technique will protect thin-walled buried drip irrigation tubes from worms and insects in a similar manner. As there is a large variation in both the products to be protected and the animals causing the damage the selection of silica or iron in combination thereof and the thickness of the protective must be determined on a case by case basis.

DETAILED DESCRIPTION

Figure 1:
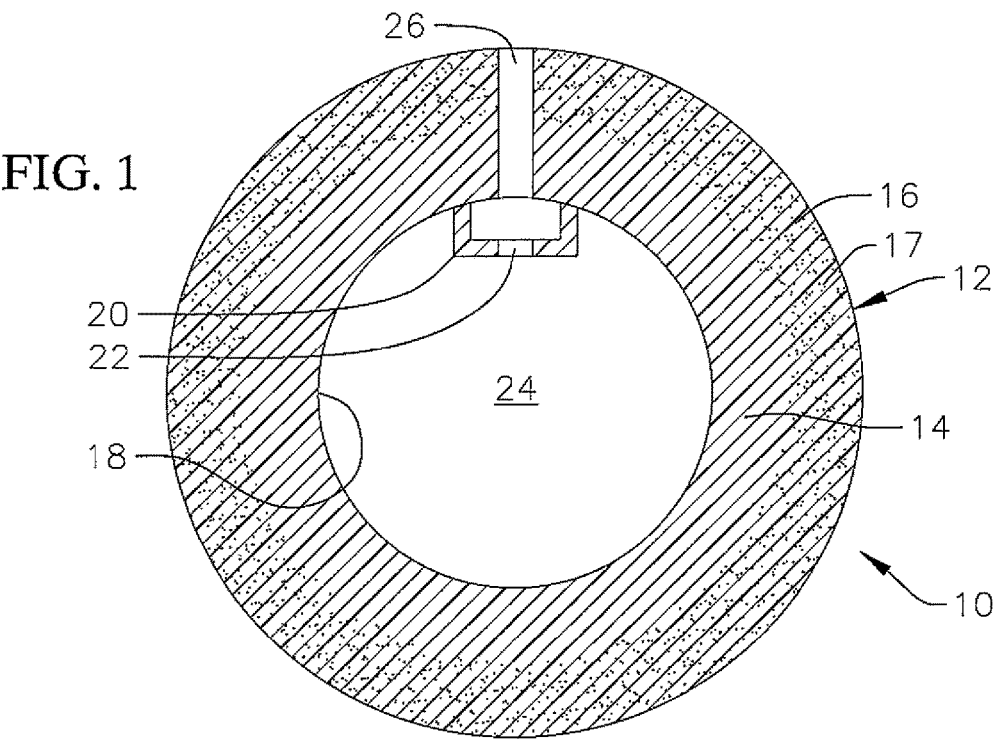
FIG. 1 is a cross-sectional view of a drip irrigation tape or tube having an internal flow path having silica particles incorporated in an outer portion of the tape or tube.

Although the present invention is applicable for all forms of irrigation tubes, FIG. 1 illustrates a cross section of a drip irrigation tape or tube 10 in accordance with the present invention. The tape or tube is a thin-walled irrigation product defined by wall thickness generally in the range of about 4 to about 50 mils. It is believed that the present invention is most useful for a drip irrigation tape product having a wall thickness in the range of about 4 to about 20 mils. A typical wall thickness of such tape products is about 8 mils, although tape products can have a wall thickness up to 40 mils. The invention can also be useful with thin-walled tubes generally having a thickness of about 30 to about 50 mils. The tape or tube preferably is made of low-density polyethylene, flexible PVC or rubber. FIG. 1 illustrates a thin-walled tube 12 comprising an inner portion 14 and an outer portion 16 wherein the outer portion 16 includes silica particles providing an outer harder surface to prevent rodents, worms and insects from damaging the tube 12.

Positioned on the inside wall 18 of the inner portion is an emitter or dripper 20 having an inlet 22 for receipt of water through flow path 24. The flow path extends continuously along the inside of the tube 12. Water enters inlet 22 in the emitter and out of the tube through outlet 26 which extends through the inner and outer portions. Drippers are spaced along the length of the tube at predetermined intervals and consequently the outlet 26 extending through the tube are similarly spaced at intervals along the tube. The outlets 26 supply water at a low drip rate and at predetermined spaced-apart intervals along an irrigation line.

The tube 12 is an extrusion wherein the silica particles are mixed in so that they are positioned in the outer portion during the extrusion process. The silica particles provide an outer layer which deters damage by rodents, worms and insects. Alternatively, the silica particles can be sprayed onto an outer surface of the tube to form the protective barrier.

The silica employed for the purpose of the invention is available commercially and includes dried silica sols, fine silicas made by burning silicon tetrachloride, dried surface esterified silicas and silica aerogels. Particle size for the silica can vary within a relatively wide range, for example, within the range of 8 to 1,000 millimicrons in diameter. The silica or silicate particles can be either hydrophilic or hydrophobic. The amount of silica particles needed can vary depending upon the particular application, but sufficient to prevent rodent, worm and insect damage of the tube. Adding submicron silica to the plastic will make the surface harder. The iron preferred for the purpose of the invention is a fine powder manufactured from an iron oxide known as Magnetite.

Additionally, a repellant that emits an odor can be added to the silica. A scented plastic composition capable of emitting a scent can be obtained by dispersing a scent-emitting material into porous finely-divided silica power as disclosed in U.S. Pat. No. 3,661,838, the contents of which are incorporated herein by reference. The submicron silica particles can carry an odor producing material that will be released when the rodent or insect scratches the surface of the silica particle.

Figure 2:
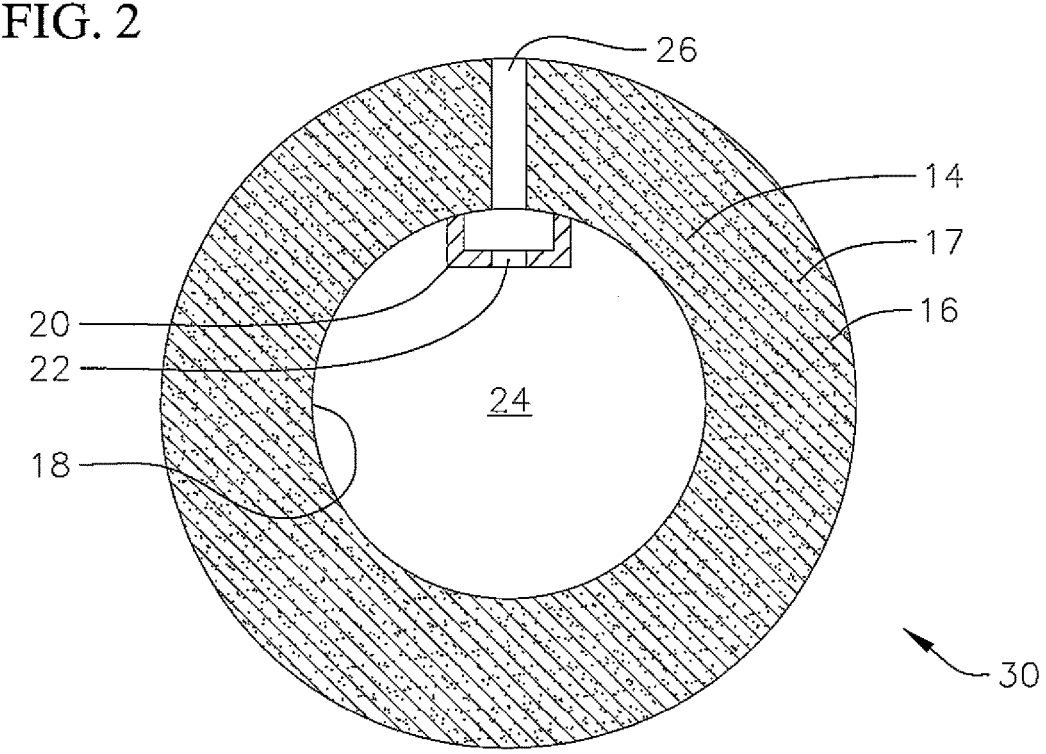
FIG. 2 is a cross-sectional view of a drip irrigation tape or tube having silica particles uniformly dispersed therein.

FIG. 2 illustrates an alternative embodiment irrigation device 30 similar to device 10 of FIG. 1 except the silica and/or iron particles are uniformly dispersed throughout the inner and outer portions of the tube.

Figure 3:
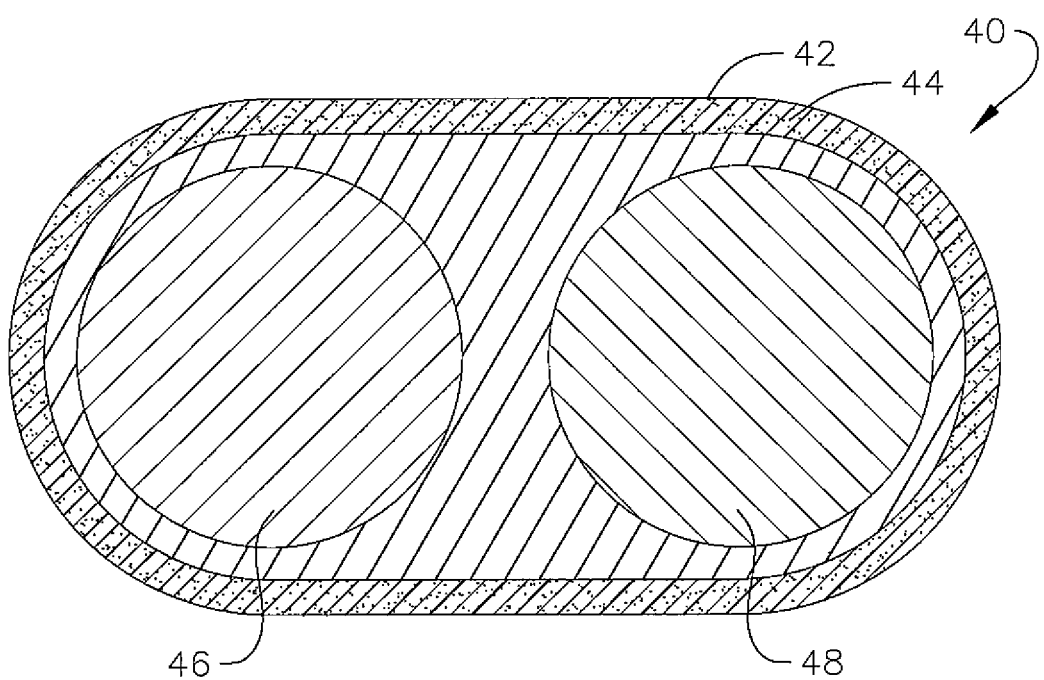
FIG. 3 is a cross-sectional view of an electric cable having silica particles dispersed in an outer portion thereof.

FIG. 3 illustrates an electrical cable or cord 40 having an outer soft plastic layer 42 containing silica particles 44 to provide a protective barrier from rodent, worm and insect damage to the wires 46,48 contained within the outer layer 42. Particles 44 also can include scent repellant as disclosed herein. An addition of finely-divided silica particles to a relatively soft plastic or rubber material used to manufacture small diameter products, such as irrigation pipe or cable, thereby increases the surface hardness of the pipe or cable, thereby reducing the risk of damage by deterring rodents, worms and insects from biting or scratching the pipe or cable. The protection is further increased by the addition of an odor-producing deterrent within the silica particles.

Although the present invention has been described and illustrated with respect to various embodiments thereof, it is to be understood that changes and modifications can be made therein which are within the full intended scope of the invention as hereinafter claimed.

What is claimed is:

1. An irrigation device comprising:
   at least a single layer flexible tube having an inner portion and an outer portion;
   a plurality of outlets extending through the tube in a spaced relationship along a length of the tube; and
   finely-divided hydrophilic silica particles dispersed in the outer portion of the tube and not the inner portion of the tube thereby having a surface hardness of the tube to deter rodent, worm or insect damage,
   wherein the tube is a low-density polyethylene or a flexible polyvinylchloride (PVC).

2. The device of claim 1 further comprising an odor repellant located within the finely-divided silica or iron oxide particles.

3. The device of claim 1 wherein the tube is rubber.

4. The device of claim 1 further comprising a plurality of emitters positioned on an inside surface of the tube in a spaced relationship such that an emitter is positioned over an outlet.

5. The device of claim 1 wherein both finely divided hydrophilic silica and iron oxide particles are dispersed within the outer portion of the tube.

6. An electric cable comprising:
   at least one wire; and
   at least a single layer flexible outer plastic or rubber covering surrounding the wire having finely-divided hydrophilic silica particles dispersed in an outer portion and not an inner portion of the covering thereby having a surface hardness of the covering to deter rodent, worm or insect damage,
   wherein the covering is a low-density polyethylene or a flexible polyvinylchloride (PVC).

7. The cable of claim 6 further comprising an odor repellant located within the finely-divided silica particles.

8. The cable of claim 6 wherein finely divided hydrophilic silica and iron oxide particles are dispersed within the outer portion of the covering.

* * * * *